US009753625B2

(12) United States Patent
Gupta et al.

(10) Patent No.: US 9,753,625 B2
(45) Date of Patent: Sep. 5, 2017

(54) IMAGE SELECTION CONTROL

(71) Applicant: Adobe Systems Incorporated, San Jose, CA (US)

(72) Inventors: Sourabh Gupta, Noida (IN); Saurabh Gupta, Noida (IN); Ajay Bedi, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 224 days.

(21) Appl. No.: 14/660,845

(22) Filed: Mar. 17, 2015

(65) Prior Publication Data
US 2016/0274767 A1   Sep. 22, 2016

(51) Int. Cl.
| G06T 17/00 | (2006.01) |
| G06F 3/0484 | (2013.01) |
| G06K 9/46 | (2006.01) |
| G06T 11/20 | (2006.01) |
| G06K 9/62 | (2006.01) |
| G06T 7/11 | (2017.01) |
| G06T 7/187 | (2017.01) |

(52) U.S. Cl.
CPC ....... *G06F 3/04845* (2013.01); *G06K 9/4671* (2013.01); *G06K 9/6202* (2013.01); *G06T 7/11* (2017.01); *G06T 7/187* (2017.01); *G06T 11/203* (2013.01); *G06T 2207/20096* (2013.01); *G06T 2207/20164* (2013.01)

(58) Field of Classification Search
CPC ...... G06F 17/50; G06F 17/5004; G06T 17/00
See application file for complete search history.

(56) References Cited

U.S. PATENT DOCUMENTS

| 5,870,100 | A  * | 2/1999  | DeFreitas | G06T 11/40 345/441 |
| 6,762,769 | B2 * | 7/2004  | Guo       | G06T 11/001 345/582 |
| 6,977,659 | B2 * | 12/2005 | Dumitras  | G06T 7/40 345/582 |
| 6,987,520 | B2 * | 1/2006  | Criminisi | G06T 11/40 345/582 |
| 7,126,609 | B1 * | 10/2006 | Asente    | G06T 11/00 345/441 |
| 8,243,062 | B2 * | 8/2012  | Schultz   | G06T 19/00 345/419 |
| 8,350,850 | B2 * | 1/2013  | Steedly   | G06T 7/0061 345/419 |
| 9,141,252 | B2 * | 9/2015  | Caruso    | G01J 3/52 |

(Continued)

*Primary Examiner* — Wesley Tucker
(74) *Attorney, Agent, or Firm* — Wolfe-SMBC

(57) ABSTRACT

Image selection control techniques are described. In one or more implementations, a method is described to control image selection in a user interface of a computing device. An input is detected by the computing device involving interaction with a display of an image in a user interface. A pattern is identified by the computing device in a portion of the image that includes the detected input. One or more objects of the content are located by the computing device that include the identified pattern, at least one said object positioned outside the portion of the image used to perform the identifying. A selection of the image is created as having the located one or more objects by the computing device in the user interface.

20 Claims, 16 Drawing Sheets

(56) References Cited

U.S. PATENT DOCUMENTS

2005/0081161 A1* 4/2005 MacInnes ........... G06F 17/5004
  715/765
2016/0055268 A1* 2/2016 Bell ................... G06F 17/5004
  703/1
2016/0055641 A1* 2/2016 Faynshteyn ......... G06F 3/04815
  345/632

* cited by examiner

1400

116

IMAGE SELECTION CONTROL

BACKGROUND

Users are provided with an ever increasing range of operations to interact with images in a user interface. As part of this interaction, a user may desire to select an object in the image, such as to change characteristics of the object using one or more editing objects, remove the object from the image, copy the image for inclusion as part of another image, and so forth.

Conventional techniques used to select an object within an image, however, typically required a user to manually trace a border of the object being selected. Although this works well for objects having regular uniform boundaries, such as those found in simple shapes, these conventional techniques do not work well for objects having irregular shapes. Accordingly, conventional techniques could involve detailed and frustrating tracing of irregular borders which could be inefficient and result in significant inaccuracies.

SUMMARY

Image selection control techniques are described. In one or more implementations, a method is described to control image selection in a user interface of a computing device. An input is detected by the computing device involving interaction with a display of an image in a user interface. A pattern is identified by the computing device in a portion of the image that includes the detected input. One or more objects of the content are located by the computing device that include the identified pattern, at least one of the objects positioned outside the portion of the image used to perform the identifying. A selection of the image is created as having the located one or more objects by the computing device in the user interface.

In one or more implementations, a system is described to control image selection in a user interface. The system includes a block definition module implemented at least partially in hardware, the block definition module is configured to define a plurality of blocks within an image. The system also includes a proximal area determination module implemented at least partially in hardware. The proximal area determination module is configured to identify a portion of the image that includes an input detected as involving interaction with a display of the image in the user interface. The system further includes a feature tracking module implemented at least partially in hardware. The feature tracking module is configured to track features of one or more of the blocks within the portion of the image in relation to one or more other said blocks that are not within the portion. The system additionally includes a selection creation module implemented at least partially in hardware. The selection creation module is configured to create a selection of the image formed using the blocks of the image that have tracked features that correspond to tracked features of the portion.

In one or more implementations, a computing device includes a processing system and computer-readable storage media comprising instructions stored thereon that, responsive to execution by the processing system, causes the processing system to perform operations. The operations include detecting a gesture as drawing a freeform line over a display of an image in a user interface, identifying a pattern in a portion of the image that includes the drawn freeform line, locating one or more objects of the content by the computing device that include the identified pattern, at least one of the objects positioned outside the portion of the image used to perform the identifying, and creating a selection of the image as having the located one or more objects by the computing device in the user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Conventional techniques used to select an object required detailed and often tedious tracing of a border of the object in an image, e.g., for editing, removal, movement within the image, and so forth. These challenges become increasing complicated as the irregularities of the object increase.

Accordingly, for such objects conventional selection techniques are often inefficient and frustrating to users.

Content selection control techniques are described. In one or more implementations, a one-touch solution is employed to select one or more objects in a user interface. The user, for instance, may draw a freeform line (e.g., via a gesture or cursor control device) over a patterned object in an image. The computing device, in response, detects a pattern in an area proximal to the freeform line and then locates objects in the image that have the pattern. Additionally, operations to locate objects may be performed even in instances in skew or rotation of the pattern, illumination changes, and so on. Once located, an indication is output in the user interface describing which objects have been located, such as through drawing of a border around the objects, shading, color changes, and so on. In this way, a user may simply indicate a part of an object of interest and have the computing device automatically select that object as well as other objects included in the image. Additional techniques may then be employed to indicate particular ones of the automatic selections to keep. Further discussion of these and other examples are described in the following sections and shown in corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
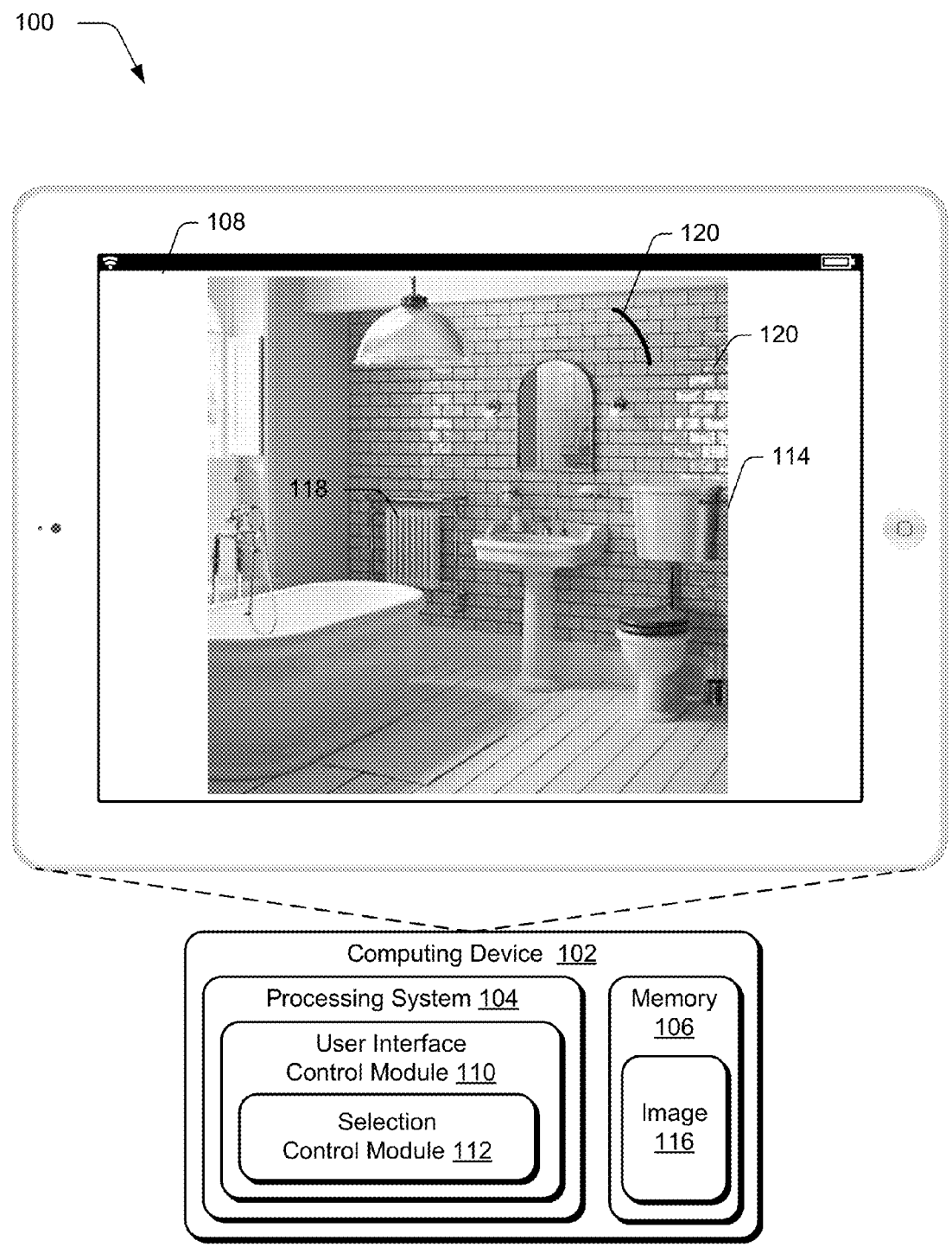
FIG. 1 is an illustration of an environment in an example implementation that is operable to employ the image selection control techniques described herein.

FIG. 1 is an illustration of an environment 100 in an example implementation that is operable to employ image selection control techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 16.

The computing device 102 is illustrated as including a variety of hardware components, examples of which include a processing system 104, an example of a computer-readable storage medium illustrated as memory 106, a display device 108, and so on. The processing system 104 is representative of functionality to perform operations through execution of instructions stored in the memory 106. Although illustrated separately, functionality of these components may be further divided, combined (e.g., on an application specific integrated circuit), and so forth.

The processing system 104 is illustrated as executing a user interface control module 110 and a content selection module 112 both of which are storable in the memory 106 and as such are implemented at least partially in hardware. The user interface control module 110 and selection control module 112 are executable by the processing system 114 to cause performance of one or more operations. Other implementations are also contemplated, such as implementation as dedicated hardware components, e.g., application specific integrated circuit, fixed-logic circuitry, and so forth.

The user interface control module 110 is representative of functionality of the computing device 102 to generate and manage interaction with a user interface 114 displayed by the display device 108. For example, a user may use a keyboard, cursor control device, gesture detected by touchscreen functionality of the display device 108, verbal utterance, and so on to interact with text or other objects displayed as part of an image 116 by the display device 108. The image 116 can include a variety of different objects, such as text, shapes or other visual objects, spreadsheets, as a document, a multimedia content, slide presentation, and so on.

The selection control module 112 is representative of functionality to aid selection of objects within an image 116 displayed in a user interface 114. The selection control module 112 does this through identification of a repeated pattern associated with the object and then selecting objects within the image that contain that pattern. In this way, the selection control module 112 may be used to select irregular and complicated objects in the image 114. In order to select a radiator 118 in the illustrated example of the image 116 in the user interface 114, convention techniques require detailed tracing along the fins and associated plumbing of the radiator. Likewise, conventional selection of the brick-patterned wall 120 would require tracing around numerous other objects in the image 116. This problem is further exacerbated in touch inputs due to reduced accuracy of the inputs. Thus, conventional techniques used to perform object selection could be both tedious, inaccurate, and frustrating.

The selection control module 112, on the other hand, is configured to detect interaction with a display of a user interface, such as to draw a freeform line 120 marked by a user, e.g., through a gesture, cursor-control device, and so on. The selection control module 112 identifies a pattern associated with the input, and then locates objects in the image 116 in the user interface 114 or elsewhere (e.g., displayed off screen) that include that pattern as a basis for making a selection. In this way, the selection control module 112 efficiently and accurately selects objects in the display of the image 116 in the user interface 114, such as to perform a cut-and-paste, image editing operation, removal, movement, and so on. The selection control module 112 may identify patterns and objects in a variety of ways, such as through part of a host service, plugin module, an application, a feature of a desktop product, and so on, an example of which is described in the following and shown in corresponding figures.

Figure 2:
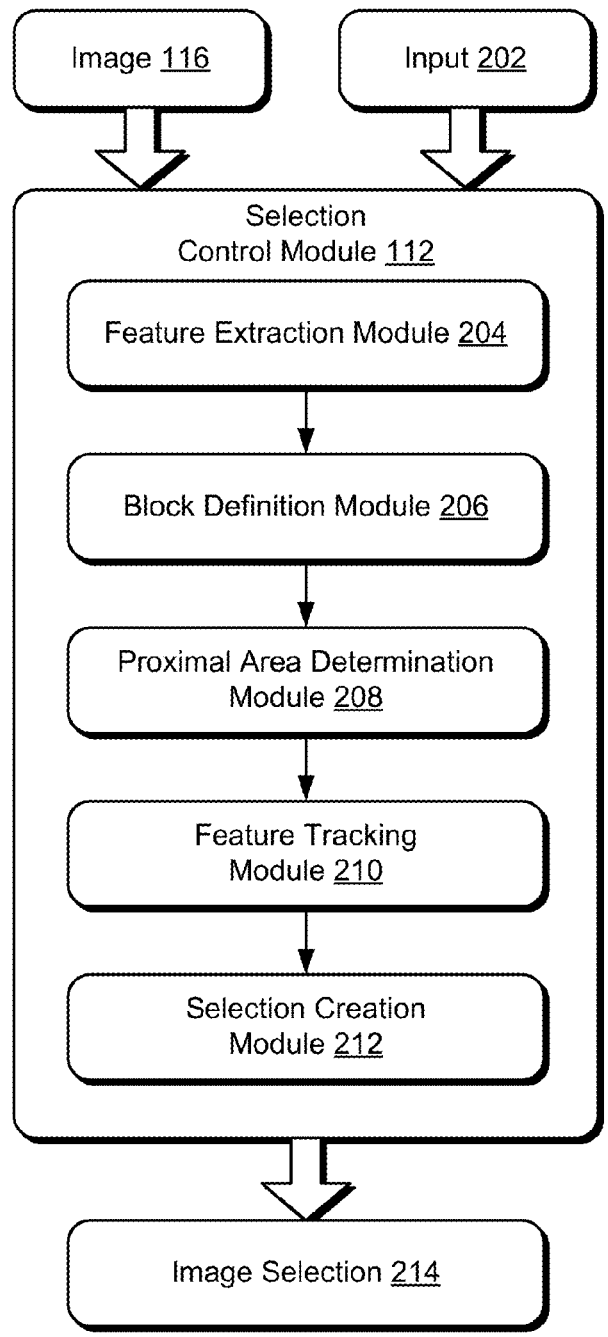
FIG. 2 depicts a system in an example implementation showing operation of a selection control module of FIG. 1 in greater detail.
Figure 3:
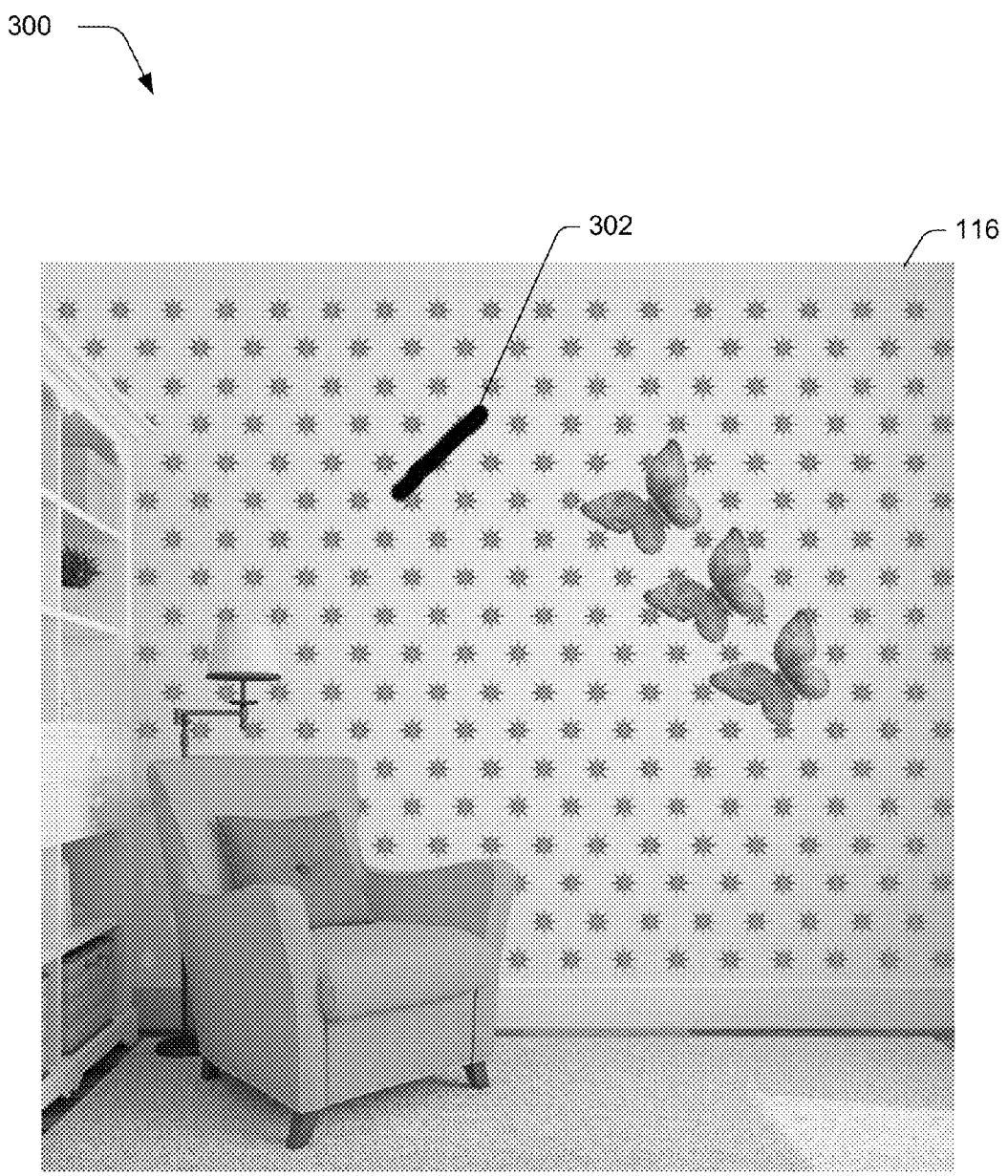
FIG. 3 depicts an example implementation of detection of an input made in relation to a portion of an image displayed by a display device of a computing device of FIG. 1.

FIG. 2 depicts a system 200 in an example implementation showing operation of the selection control module 112 of FIG. 1 in greater detail. In the following, the selection control module 112 is configured to receive an input 202 detected (e.g., via touchscreen functionality of the display device 108) as a single touch made in relation to an image 116, an example of which is an input 302 drawn as a line over an image 116 of a living room as shown in FIG. 3. The selection control module then detects a pattern around the input, and locates this pattern, where it exists, in an entirety of the image 116, e.g., using SIFT and modified KLT trackers as described below. Block-based super pixel generation is used to divide the image into blocks with concrete edge boundaries, which helps to increases precision in separation of objects within the image 116. Additionally, the selection control module 112 is configured to take into account skewing, scaling, and rotation of the pattern as part of the location of the objects. This location is then used as a basis to form the selection of the objects.

This functionality is illustrated through use of a feature extraction module 204, block definition module 206, proximal area determination module 208, feature tracking module 210, and selection creation module 212 to create an image selection 214 by the selection control module 112 based on the image 116 and the input 202. The functionality represented by these modules support selection of objects in an image 116 involving minimal user input (e.g., a single non-intersecting line is sufficient) that is usable by touch-based input devices to select complex and irregularly shaped objects. Functionality of the modules of FIG. 2 is described in parallel with FIGS. 3-14 and therefore the following discussion alternates between the discussion of FIG. 2 and FIGS. 3-14.

The feature extraction module 204 is representative of functionality to extract features from the image 116 and the block definition module 206 is representative of functionality to partition the image into a plurality of concrete blocks. As this functionality is not dependent on the input 202, feature extraction and block creation are performable as part of preprocessing of the image 116 before the input 202 is received. Other examples are also contemplated, such as to perform this processing responsive to detection of the input 202.

For any object in the image 116 there are many points that may be considered interesting in that these points uniquely represent the object. These points are extracted by the feature extraction module 204 to provide a feature description of that object. This description is then used to locate objects in the image 116 that contains one or more similar features.

Figure 4:
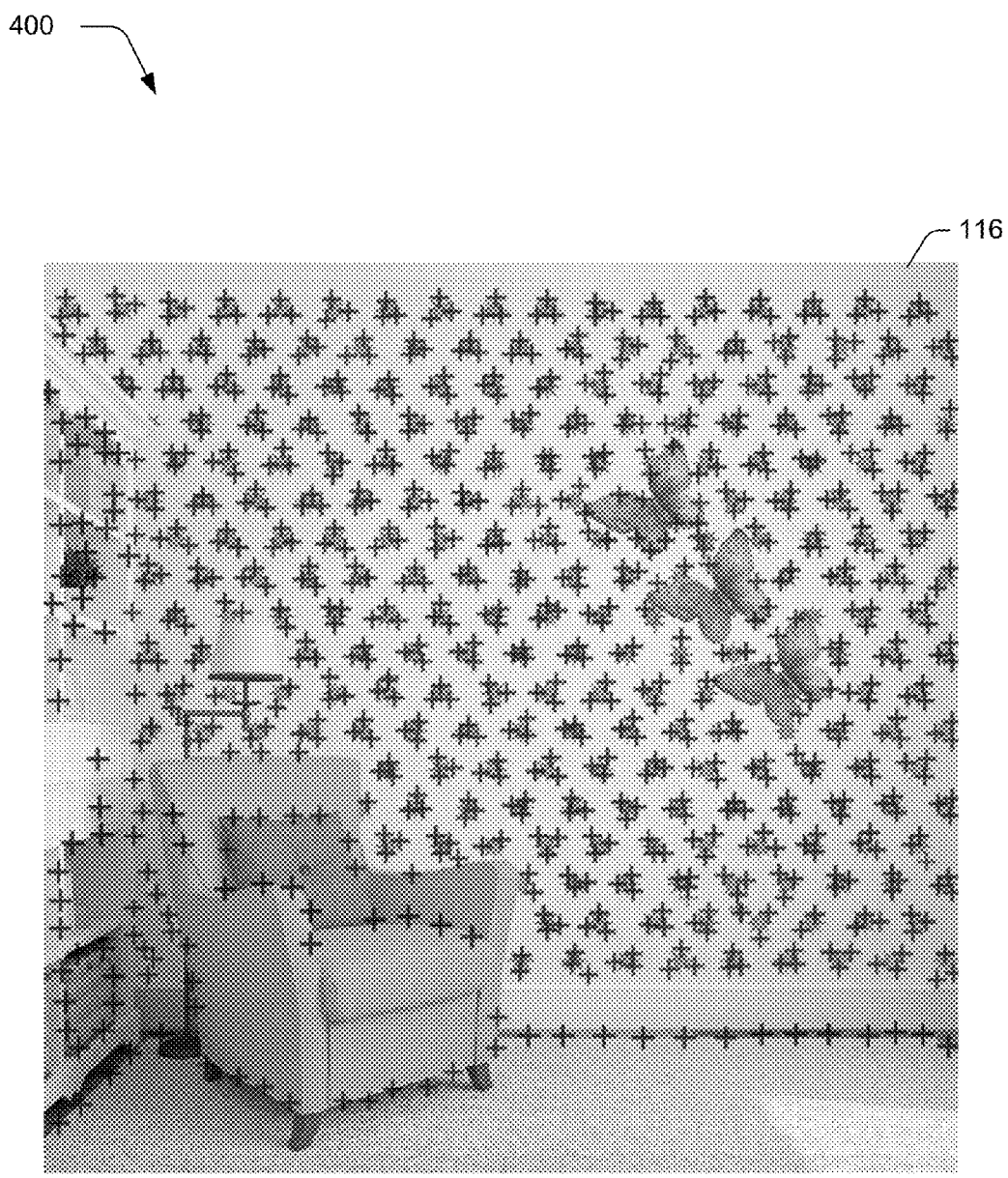
FIG. 4 depicts an example implementation shown application of a feature extraction module of FIG. 2 to extract features from the image of FIG. 3.

FIG. 4 depicts an example implementation 400 showing application of the feature extraction module 204 to extract features from the image 116. There are a variety of different techniques that are employable by the feature extraction module 204 to extract features.

One such example is a Scale Invariant Feature Transform (SIFT) feature, which is not affected by object scaling, rotation, changes in illumination, and is resilient to the effects of noise in the image 116. The SIFT approach, for image feature extraction, takes an image and transforms it into a collection of local feature vectors, which are illustrated as plus signs in the example implementation 400 of FIG. 4. Each of these feature vectors are invariant to scaling, rotation, or translation of the image 116.

Figure 5:
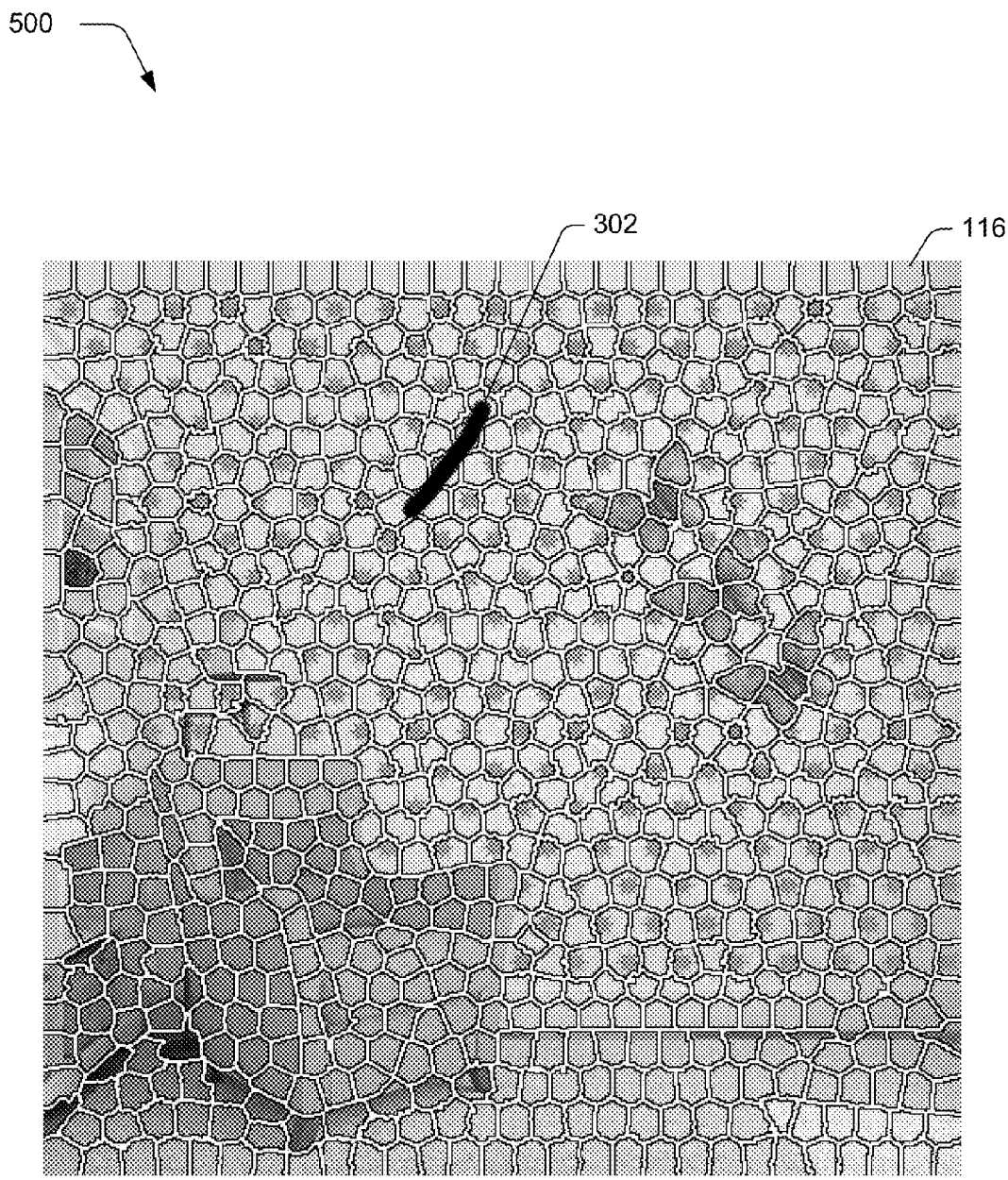
FIG. 5 depicts an example implementation in which the image is segmented to form a plurality of blocks.

FIG. 5 depicts an example implementation 500 in which the image 116 is segmented to form a plurality of blocks. In this example, the block definition module 206 divides the images 116 into a plurality of blocks, which may be performed in a variety of ways. For example, the block definition module 206 first chooses seed pixels that are distributed (e.g., generally equally) through the image 116.

An area proximal to those pixels is then grown to define the block based on pixel intensity difference, such that pixels that are considered similar below a threshold difference are included as part of a block having that pixel. In one or more implementations, a size threshold is also employed such that once a size of a block reaches the threshold, a new block is created. In this way, an entirety of the image 116 is segmented into concrete blocks, the edges of which may also be used to define a border of a selection as further described below.

Figure 6:
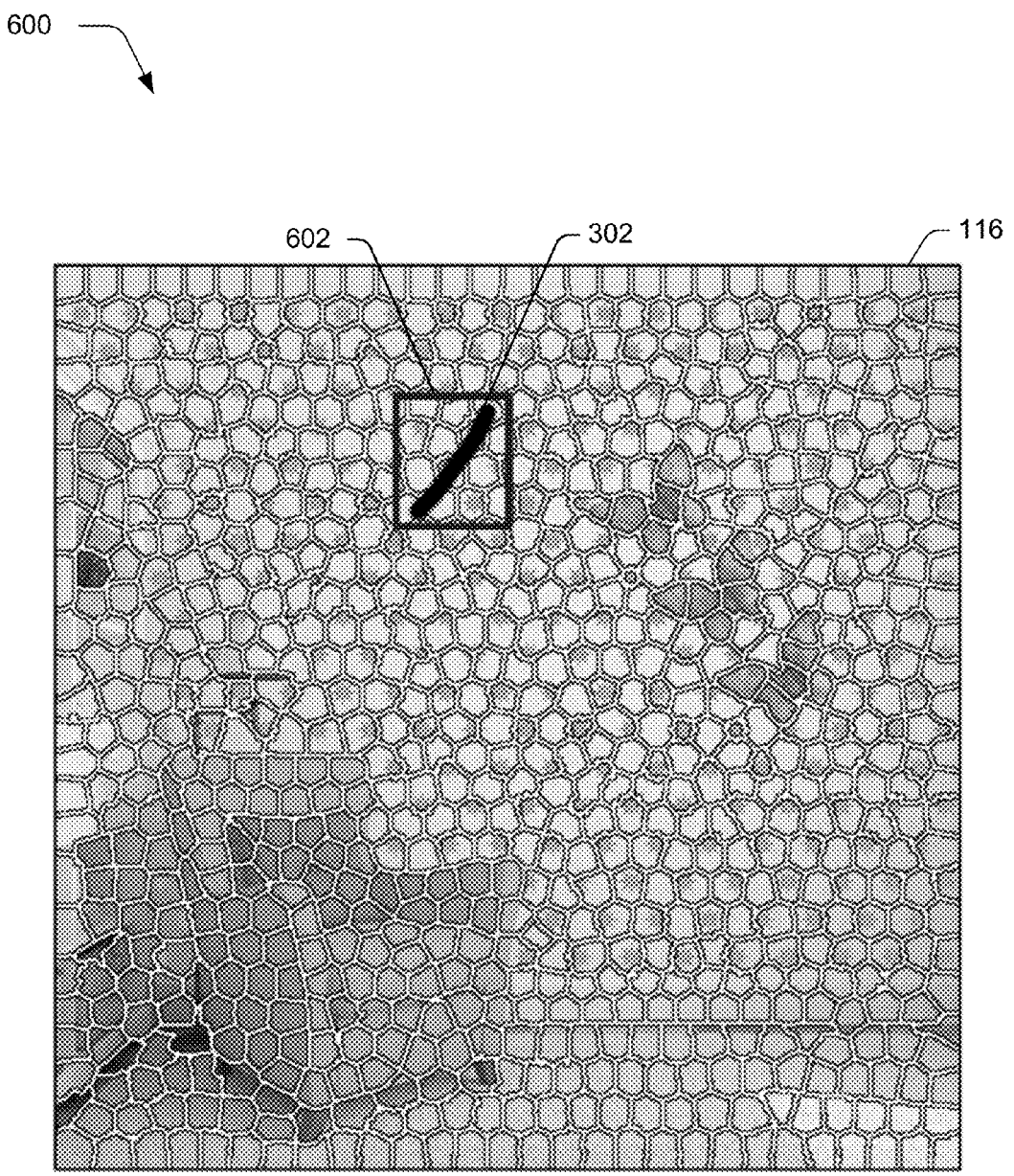
FIG. 6 depicts an example implementation in which an area proximal to the detected input of FIG. 3 is determined by a proximal area determination module of FIG. 2.

FIG. 6 depicts an example implementation 600 in which an area proximal to the detected input 302 is determined by a proximal area determination module 208. In this example, the user input 302 has been detected. The proximal area determination module 208, for instance, defines an area 602 that includes (e.g., surrounds) at least a portion of the input 302.

This area is then considered by the selection control module 112 as containing a unique pattern of a desired selected area. Although a rectangle is shown, a variety of different shapes and sizes are contemplated, such as based on a shape or size of the detected input. Additionally, support for multiple inputs and corresponding patterns are also contemplated such that a user can indicate multiple objects, an object having multiple patterns, and so forth.

Figure 7:
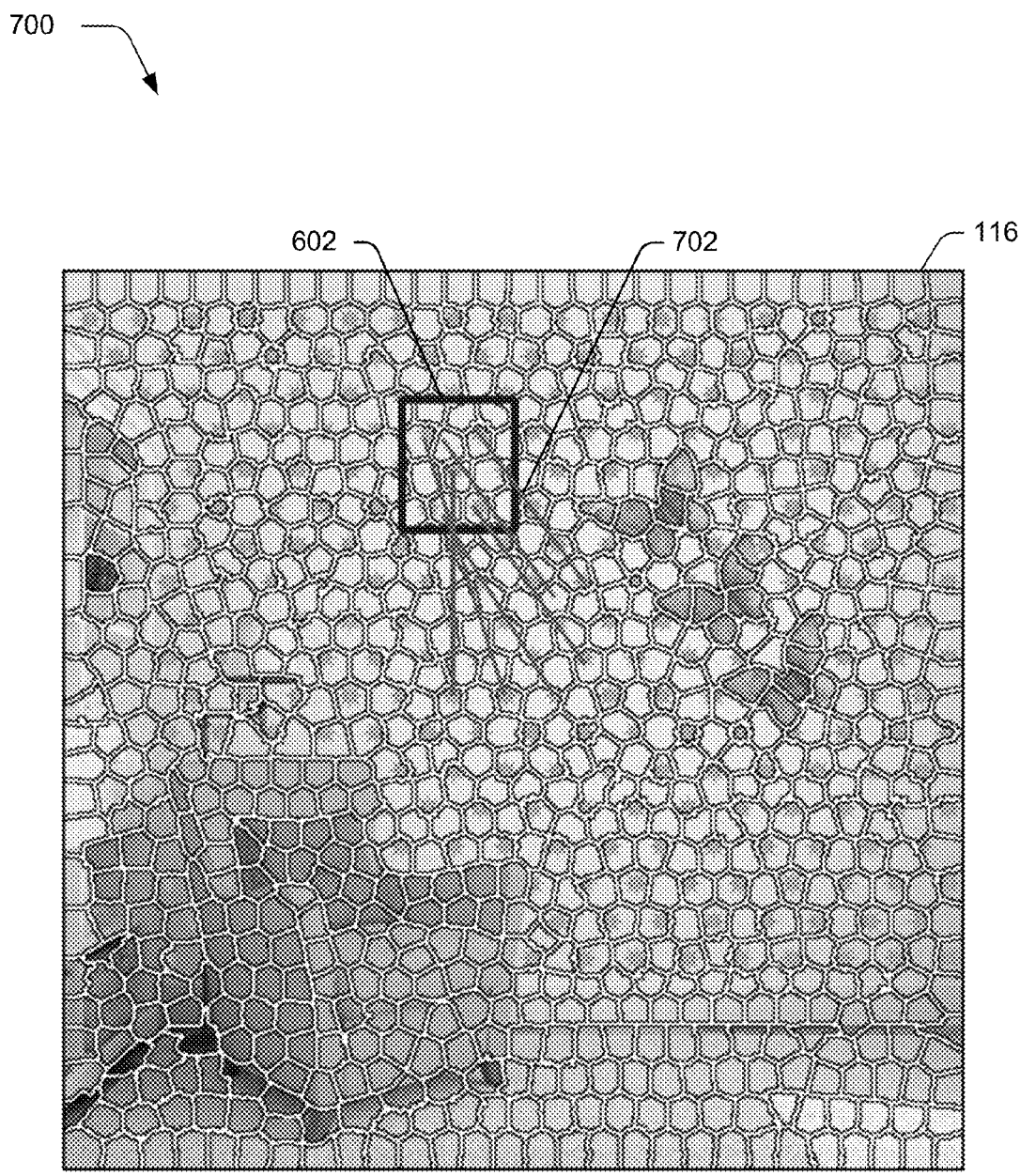
FIG. 7 depicts an example implementation in which feature tracking is performed from the area of FIG. 6 to other portions of the image by a feature tracking module of FIG. 2.

FIG. 7 depicts an example implementation 700 in which feature tracking is performed from the area 602 of FIG. 6 to other portions of the image 116 by the feature tracking module 210 of FIG. 2. Features extracted by the feature extraction module 204 as described in relation to FIG. 4 that are contained within the area 602 are used by the feature tracking module 210 to track features of the image 116 that lie outside the area 602.

This is illustrated through the use of lines 702 indicating correspondence of features within the area 602 to features outside the area that are within the image 116. Continuing with the previous example in which a SIFT feature detector is used, rotated or scaled features are also identified and thus addresses situations in which patterns look similar visually but are not exactly the same, e.g., are rotated, transformed, and so on as described above.

Figure 11:
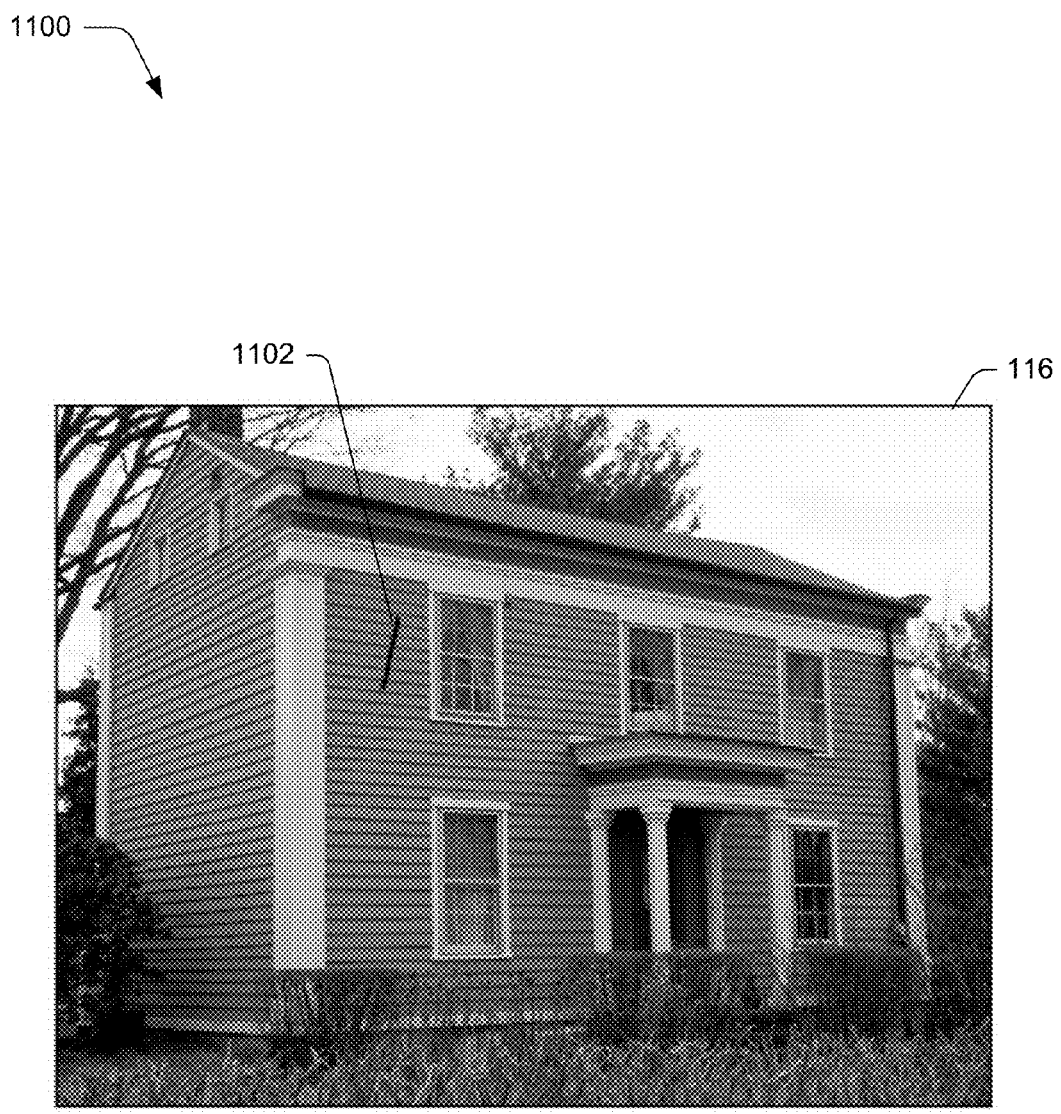
FIGS. 11-14 depict additional example implementations of image selection control in which a selected portion is deselected by a user.
Figure 12:
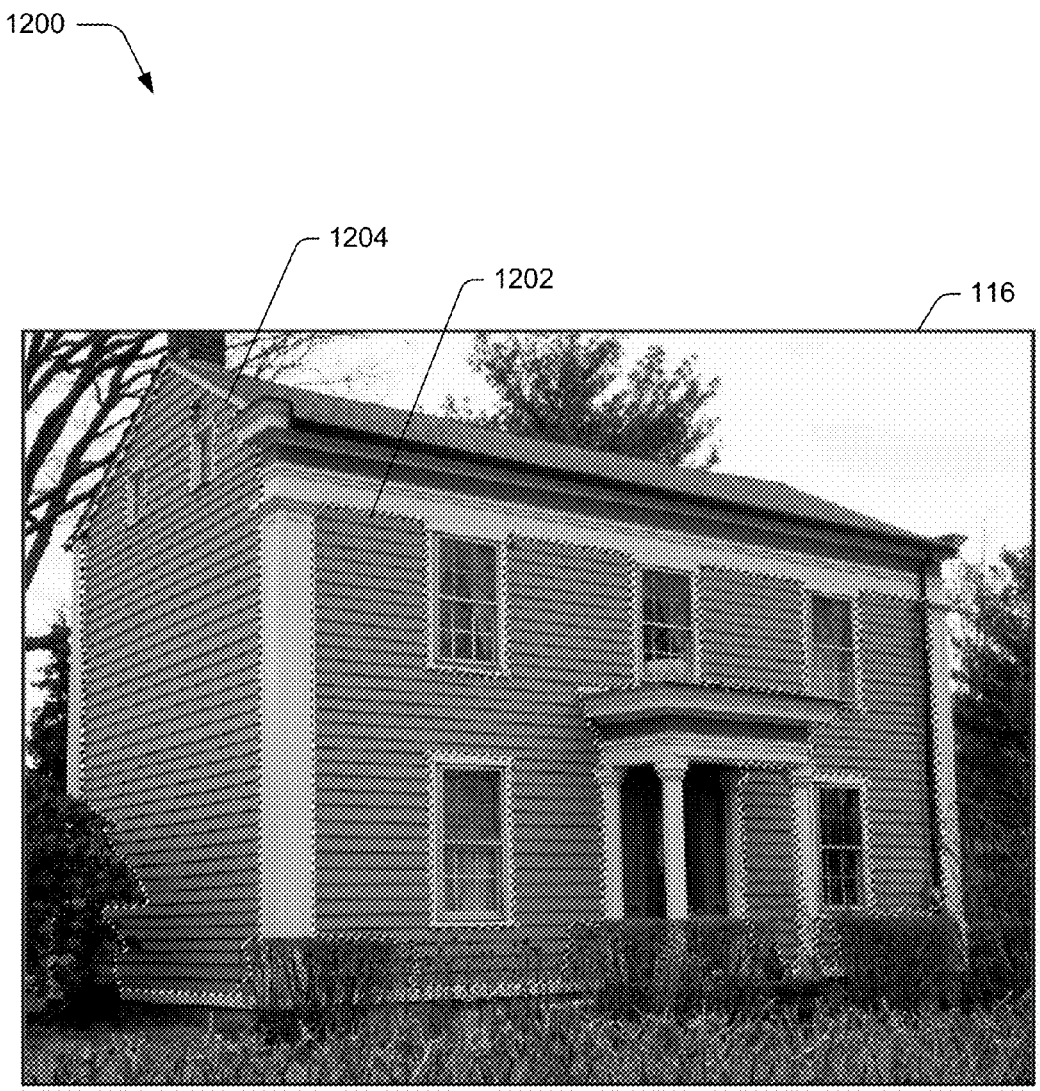
Figure 13:
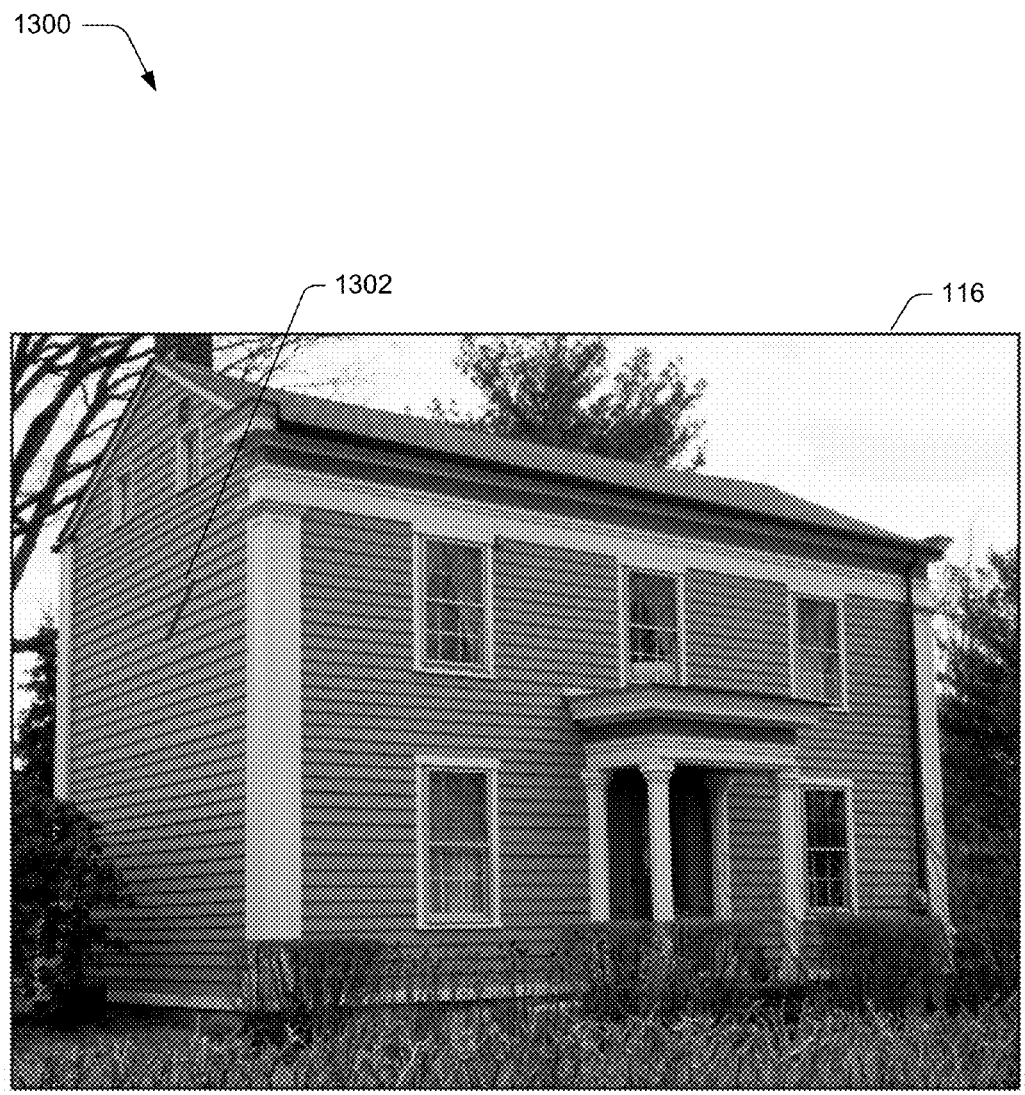
Figure 14:
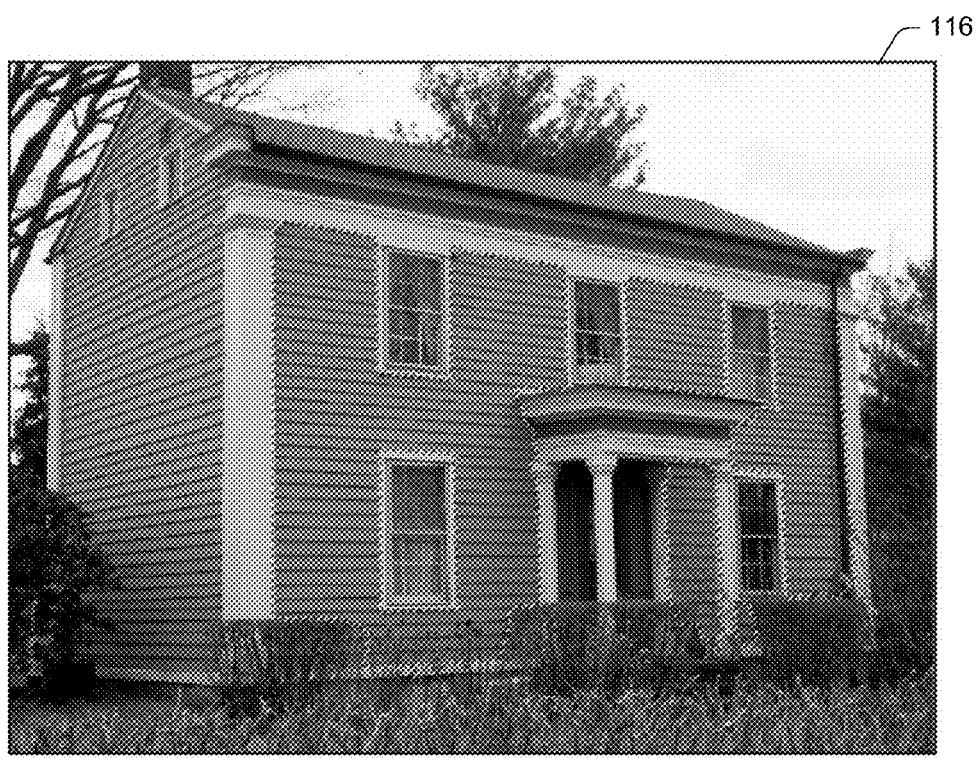

During tracking, the feature tracking module 210 is configured to assure that any two features in the area (i.e., the source) are proportionally equidistant in blocks that are considered a match outside of the area, which reduces false positives. As shown in FIG. 11, for instance, the feature tracking module 210 is configured to ensure that a distance between the siding of the house (e.g., individual boards) is proportional. Other examples are also contemplated, such as the tops and bottoms of the stars in FIGS. 3 and 4. In this way, the feature tracking module 210 locates and identifies one or more object having the features that lie within and outside of the area 602 using SIFT as described above and KLT (Kanade-Lucas-Tomasi) trackers that make use of spatial intensity information to direct a search for a position that in the image 116 that yields a best match.

Figure 8:
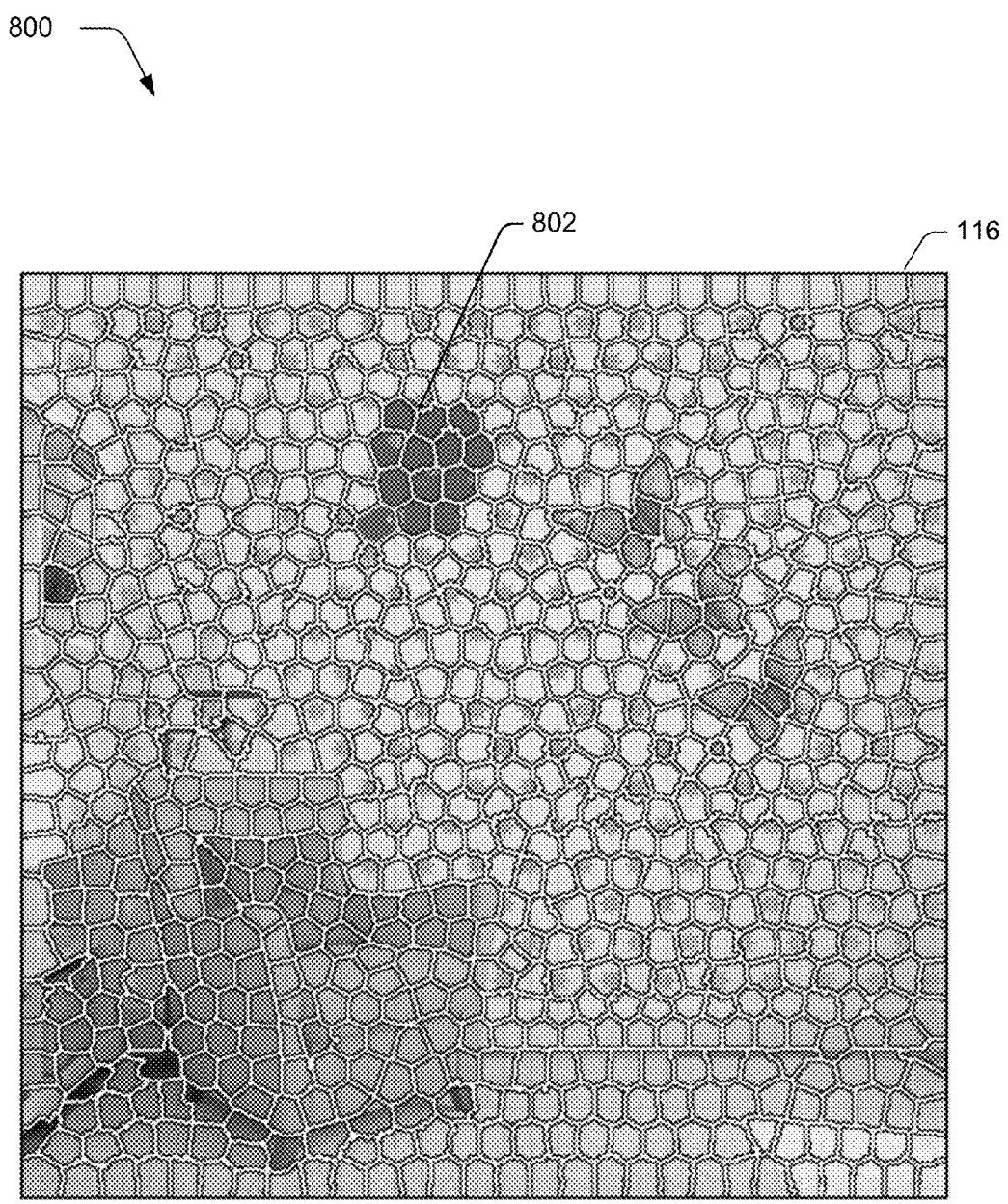
FIGS. 8-10 depicts an example implementations in which an image selection is created by a selection creation module of FIG. 2 based on the feature tracking of FIG. 7.
Figure 9:
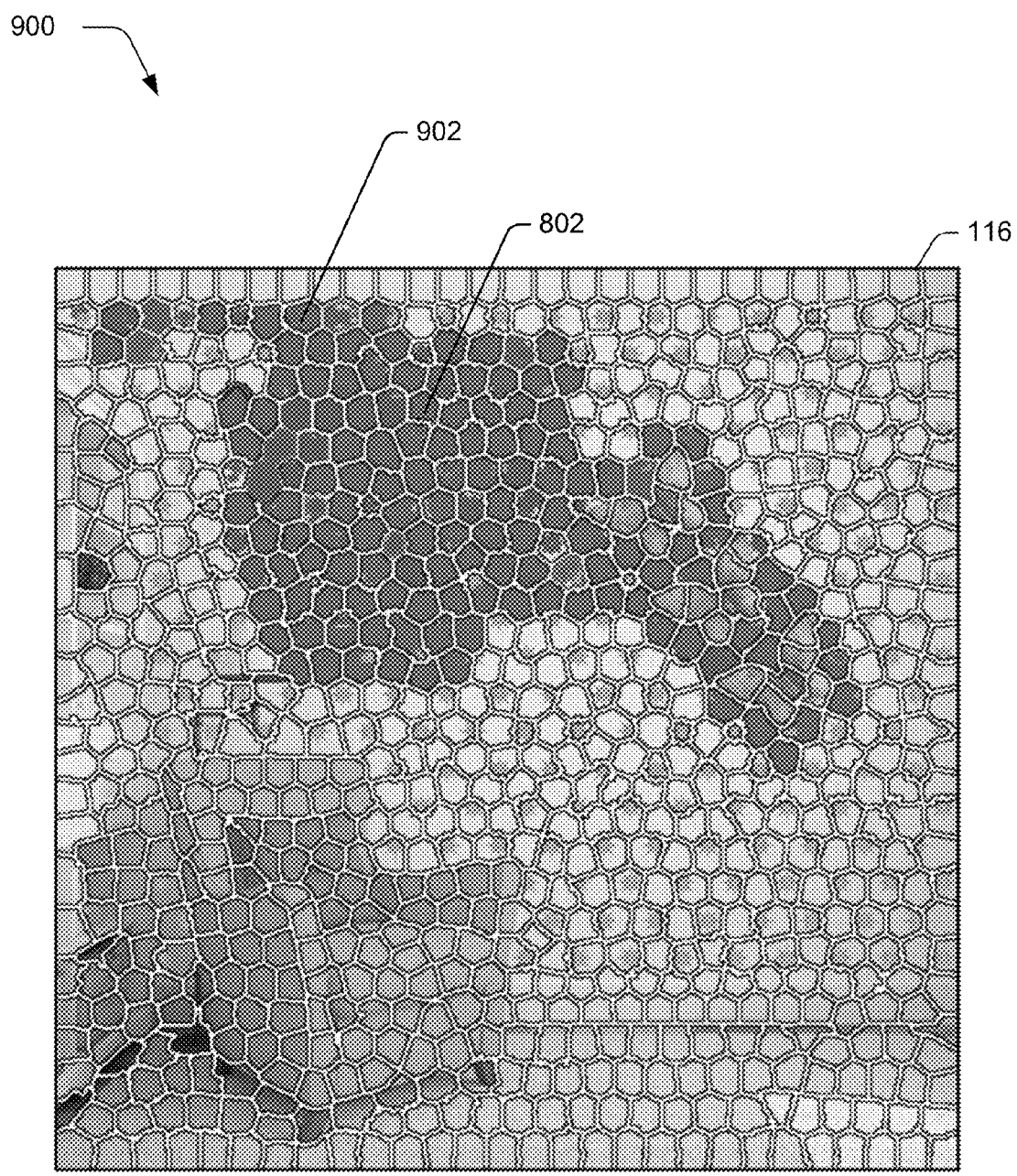
Figure 10:
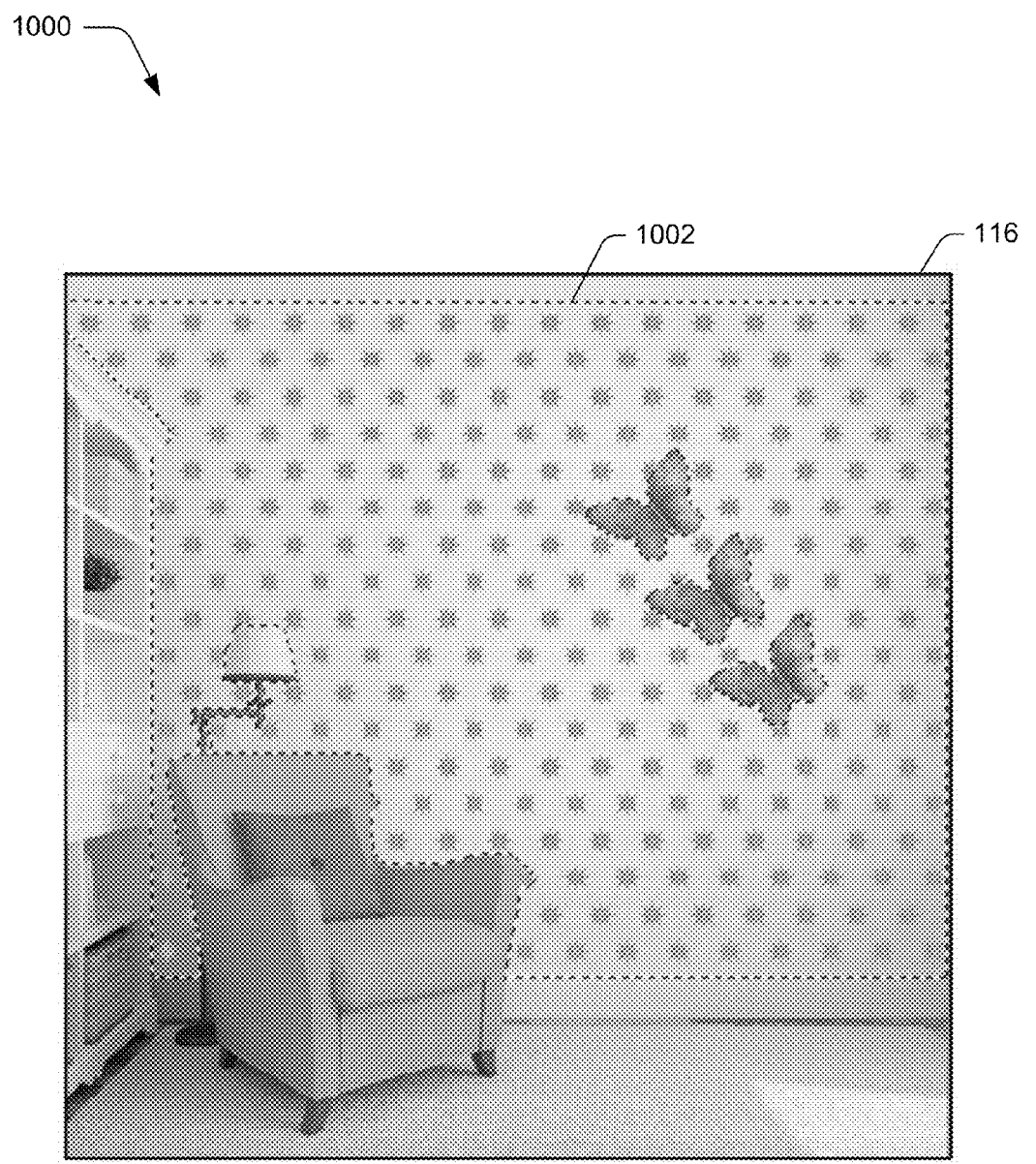

FIGS. 8-10 depicts an example implementations 800, 900, 1000 in which an image selection 214 is created by the selection creation module 212 based on the feature tracking of FIG. 7. The selection creation module 212 accepts as an input the tracked features of the feature tracking module 210 of FIG. 7. At the example implementation 800 of FIG. 8, the selection creation module 212 begins locating blocks that are above a threshold amount of similarity, one to another. Once performed, the selected blocks are combined to create a selection. This process continues as shown in FIG. 9 in which additional blocks 902 are chosen, which may be performed using the previous threshold level of similarity or a lower threshold indicating less similar blocks.

This process is performed until there are no longer any remaining blocks of the image that have at least a minimum level of similarity as defined by a threshold and/or is not contiguous with a current selection that is being expanded. In this way, selection of the blocks continues, and once done, a selection is made around an area filled by the blocks, thereby defining a border 1002 of the selection as shown in FIG. 10. Other techniques to indicate selection in the user interface are also contemplated, such as shading, change in visual characteristic, color changes, and so forth.

FIGS. 11-14 depict additional example implementations 1100, 1200, 1300, 1400 of image selection control in which a selected portion is deselected by a user. As shown in FIG. 11, an input 1102 is detected in which a user has drawn a non-intersecting freeform line over the siding of a house included in an image 116. Following the techniques described above in relation to FIGS. 3-10, this causes selection 1202 of a front wall of the house and selection 1204 of a side wall of the house that includes siding having similar patterns.

A user in this instance, however, wants to keep the selection 1202 of the front wall and discard the selection 1204 of the side wall. Accordingly, another input 1302 is provided by the user, e.g., by drawing another freeform line on the within a boundary of the selection 1204 of the side wall that is not desired. In response, the selection control module 112 removes the selection 1204 of the side wall but keeps the selection 1202 of the front wall as shown in the example implementation of FIG. 14. Accordingly, a user may individually deselect objects (e.g., the side wall) in this example and in this way supports one-touch interaction to select and deselect desired portions without tracing borders of the selections. Further discussion of these and other examples is described in the following and shown in corresponding figure.

Example Procedures

The following discussion describes image selection control techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-14.

Figure 15:
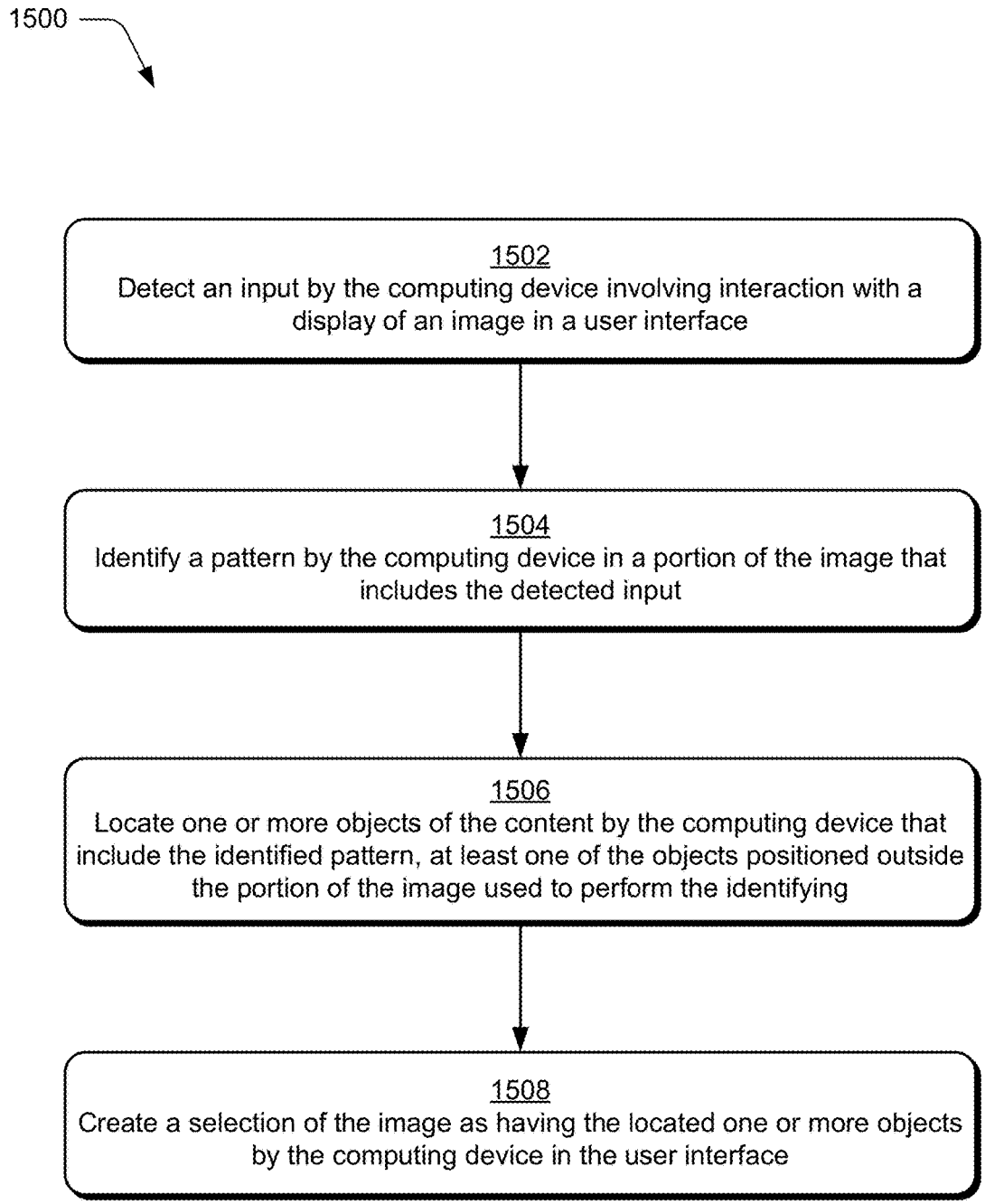
FIG. 15 is a flow diagram depicting a procedure in an example implementation in which content selection control techniques are described.

FIG. 15 depicts a procedure 1500 in an example implementation in which content selection control techniques are described. A method is described to control image selection in a user interface of a computing device. An input is detected by the computing device involving interaction with a display of an image in a user interface (block 1502). The input is detectable in a variety of ways, such as via a gesture (e.g., tap, drawing of a line), cursor control device, and so on. As shown in FIGS. 3-14, for instance, the input may be provided as a freeform line disposed over a portion of an area to be selected, but does not form a border of the selected area. In this way, the input may be provided using gestures, which was not supported under conventional techniques due to a requirement of detailed tracing of a border of a selected area.

A pattern is identified by the computing device in a portion of the image that includes the detected input (block 1504). The portion 602, for instance, may be defined as an area that includes the input 302, may have a shape at least partially defined by the input, and so forth. A pattern is then identified from this portion that is usable to find similar objects in the image 116.

One or more objects of the content are located by the computing device that include the identified pattern, at least one object positioned outside the portion of the image used to perform the identifying (block 1506). A selection of the image is created as having the located one or more objects by the computing device in the user interface (block 1508). As shown in the selection 1002 of FIG. 10, the selection includes portions of the image outside of both the input 302 and even the portion 602 of the image 116 that include the pattern. As this area is contiguous, an outside edge is used to define a border of the selection 1002 in an efficient and intuitive manner without involving detailed tracing and fine accuracy and is thus suitable for touch-based devices as described above.

Example System and Device

Figure 16:
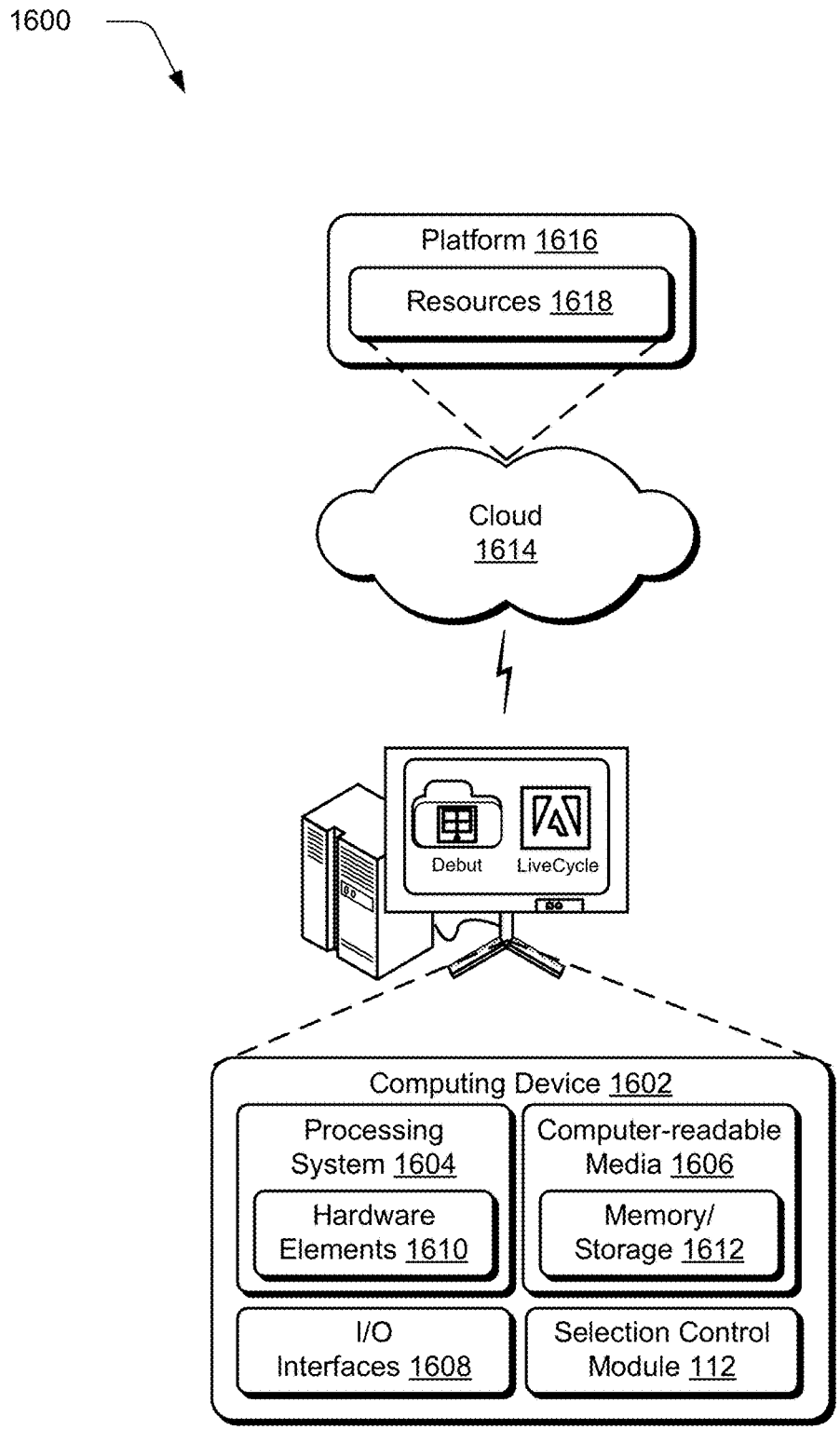
FIG. 16 illustrates an example system including various components of an example device that can be implemented as any type of computing device as described and/or utilize with reference to FIGS. 1-15 to implement embodiments of the techniques described herein.

FIG. 16 illustrates an example system generally at 1600 that includes an example computing device 1602 that is representative of one or more computing systems and/or devices that may implement the various techniques described herein. This is illustrated through inclusion of the selection control module 116. The computing device 1602 may be, for example, a server of a service provider, a device associated with a client (e.g., a client device), an on-chip system, and/or any other suitable computing device or computing system.

The example computing device 1602 as illustrated includes a processing system 1604, one or more computer-readable media 1606, and one or more I/O interface 1608 that are communicatively coupled, one to another. Although not shown, the computing device 1602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1604 is representative of functionality to perform one or more operations using hardware. Accordingly, the processing system 1604 is illustrated as including hardware element 1610 that may be configured as processors, functional blocks, and so forth. This may include implementation in hardware as an application specific integrated circuit or other logic device formed using one or more semiconductors. The hardware elements 1610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1606 is illustrated as including memory/storage 1612. The memory/storage 1612 represents memory/storage capacity associated with one or more computer-readable media. The memory/storage component 1612 may include volatile media (such as random access memory (RAM)) and/or nonvolatile media (such as read only memory (ROM), Flash memory, optical disks, magnetic disks, and so forth). The memory/storage component 1612 may include fixed media (e.g., RAM, ROM, a fixed hard drive, and so on) as well as removable media (e.g., Flash memory, a removable hard drive, an optical disc, and so forth). The computer-readable media 1606 may be configured in a variety of other ways as further described below.

Input/output interface(s) 1608 are representative of functionality to allow a user to enter commands and information to computing device 1602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1610 and computer-readable media 1606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1610. The computing device 1602 may be configured to implement particular instructions and/or functions corresponding to the software and/or hardware modules. Accordingly, implementation of a module that is executable by the computing device 1602 as software may be achieved at least partially in hardware, e.g., through use of computer-readable storage media and/or hardware elements 1610 of the processing system 1604. The instructions and/or functions may be executable/operable by one or more articles of manufacture (for example, one or more computing devices 1602 and/or processing systems 1604) to implement techniques, modules, and examples described herein.

The techniques described herein may be supported by various configurations of the computing device 1602 and are not limited to the specific examples of the techniques described herein. This functionality may also be implemented all or in part through use of a distributed system, such as over a "cloud" 1614 via a platform 1616 as described below.

The cloud 1614 includes and/or is representative of a platform 1616 for resources 1618. The platform 1616 abstracts underlying functionality of hardware (e.g., servers) and software resources of the cloud 1614. The resources 1618 may include applications and/or data that can be utilized while computer processing is executed on servers that are remote from the computing device 1602. Resources 1618 can also include services provided over the Internet and/or through a subscriber network, such as a cellular or Wi-Fi network.

The platform 1616 may abstract resources and functions to connect the computing device 1602 with other computing devices. The platform 1616 may also serve to abstract scaling of resources to provide a corresponding level of scale to encountered demand for the resources 1618 that are implemented via the platform 1616. Accordingly, in an interconnected device embodiment, implementation of functionality described herein may be distributed throughout the system 1600. For example, the functionality may be implemented in part on the computing device 1602 as well as via the platform 1616 that abstracts the functionality of the cloud 1614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method to control image selection in a user interface of a computing device, the method comprising:
    detecting an input by the computing device involving interaction with a display of an image in a user interface;
    identifying a pattern by the computing device in a portion of the image that includes the detected input;
    locating one or more objects of the content by the computing device that include the identified pattern, at least one said object positioned outside the portion of the image used to perform the identifying; and
    creating a selection of the image as having the located one or more objects by the computing device in the user interface.

2. A method as described in claim 1, wherein the selection of the located one or more objects indicates one or more borders of the one or more objects having the identified pattern in the user interface.

3. A method as described in claim 2, wherein the input is detected within at least one said border.

4. A method as described in claim 1, wherein:
    the pattern includes a plurality of elements that define the pattern; and
    an area of interaction with the display of content at which the input is detected includes one or more of the plurality of elements but does not include at least one of the plurality of elements.

5. A method as described in claim 1:
    further comprising defining a plurality of blocks within the image;
    wherein the identifying includes extracting features of the image by the computing device; and
    wherein the locating includes tracking features of one or more said blocks within the portion of the image in relation to one or more other said blocks that are not within the portion that form the one or more objects.

6. A method as described in claim 5, wherein the defining includes:
    choosing pixels by the computing device as seeds that are distributed through the image;
    forming the plurality of blocks by growing the pixels based on pixel intensity difference, one to another, such that the display of the image is formable from the plurality of blocks.

7. A method as described in claim 5, wherein the extracting of the features is performed using a Scale Invariant Feature Transform (SIFT).

8. A method as described in claim 5, wherein the creating of the selection is performed by combining blocks of the plurality of blocks of the image based on the traced features.

9. A method as described in claim 8, further comprising indicating the created selection in the user interface by the computing device as defined by a border of the combined blocks.

10. A method as described in claim 1, wherein the detected input is a freeform line.

11. A system to control image selection in a user interface, the system comprising:
    a block definition module implemented at least partially in hardware, the block definition module configured to define a plurality of blocks within an image;
    a proximal area determination module implemented at least partially in hardware, the proximal area determination module configured to identify a portion of the image that includes an input detected as involving interaction with a display of the image in the user interface;
    a feature tracking module implemented at least partially in hardware, the feature tracking module configured to track features of one or more said blocks within the portion of the image in relation to one or more other said blocks that are not within the portion; and
    a selection creation module implemented at least partially in hardware, the selection creation module configured to create a selection of the image formed using the blocks of the image that have tracked features that correspond to tracked features of the portion.

12. A system as described in claim 11, wherein the features are extracted using a Scale Invariant Feature Transform (SIFT).

13. A system as described in claim 11, wherein the creating of the selection is performed by combining blocks of the plurality of blocks of the image based on the traced features.

14. A system as described in claim 11, wherein the block definition module is configured to perform the definition of the plurality of blocks by:
    choosing pixels by the computing device as seeds that are distributed through the image;
    forming the plurality of blocks by growing the pixels based on pixel intensity difference, one to another, such that the display of the image is formable from the plurality of blocks.

15. A system as described in claim 11, wherein the selection creation module is configured to indicate the created selection in the user interface as defined by a border of the combined blocks.

16. A computing device comprising:
    a processing system; and
    computer-readable storage media comprising instructions stored thereon that, responsive to execution by the processing system, causes the processing system to perform operations comprising:
        detecting a gesture as drawing a freeform line over a display of an image in a user interface;
        identifying a pattern in a portion of the image that includes the drawn freeform line;
        locating one or more objects of the content by the computing device that include the identified pattern, at least one said object positioned outside the portion of the image used to perform the identifying; and
        creating a selection of the image as having the located one or more objects by the computing device in the user interface.

17. A computing device as described in claim 16, wherein the selection of the located one or more objects indicates one or more borders of the one or more objects having the identified pattern in the user interface.

18. A computing device as described in claim 17, wherein the freeform line is drawn within at least one said border.

19. A computing device as described in claim 16, wherein the selection defines an area of the image to which an image editing operation is applied.

20. A computing device as described in claim 19, wherein the image editing operation is not applied to an area of the image outside the selection.

* * * * *

UNITED STATES PATENT AND TRADEMARK OFFICE
CERTIFICATE OF CORRECTION

PATENT NO. : 9,753,625 B2
APPLICATION NO. : 14/660845
DATED : September 5, 2017
INVENTOR(S) : Gupta et al.

It is certified that error appears in the above-identified patent and that said Letters Patent is hereby corrected as shown below:

On the Title Page

Item [74], delete "Wolfe-SMBC", insert -- Wolfe-SBMC --, therefor.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*